Sept. 22, 1970     H. S. HOLLNAGEL ET AL     3,530,493
FLOATING FRICTION BRAKE FOR ROTARY DISK
Filed Oct. 2, 1968     6 Sheets-Sheet 1
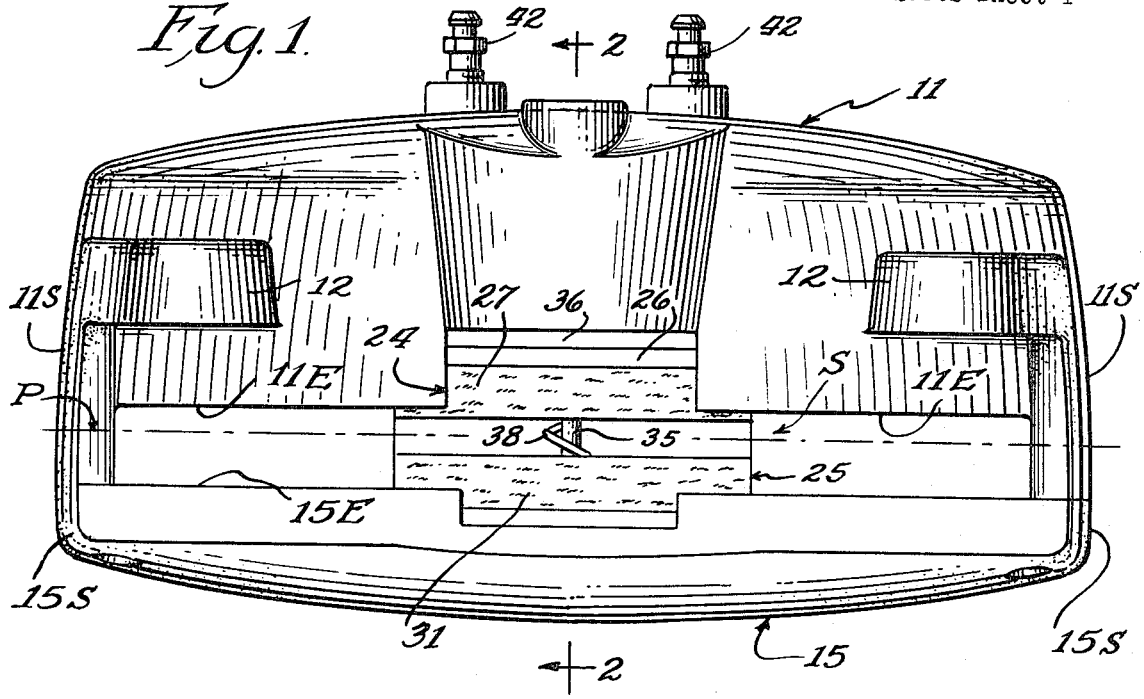
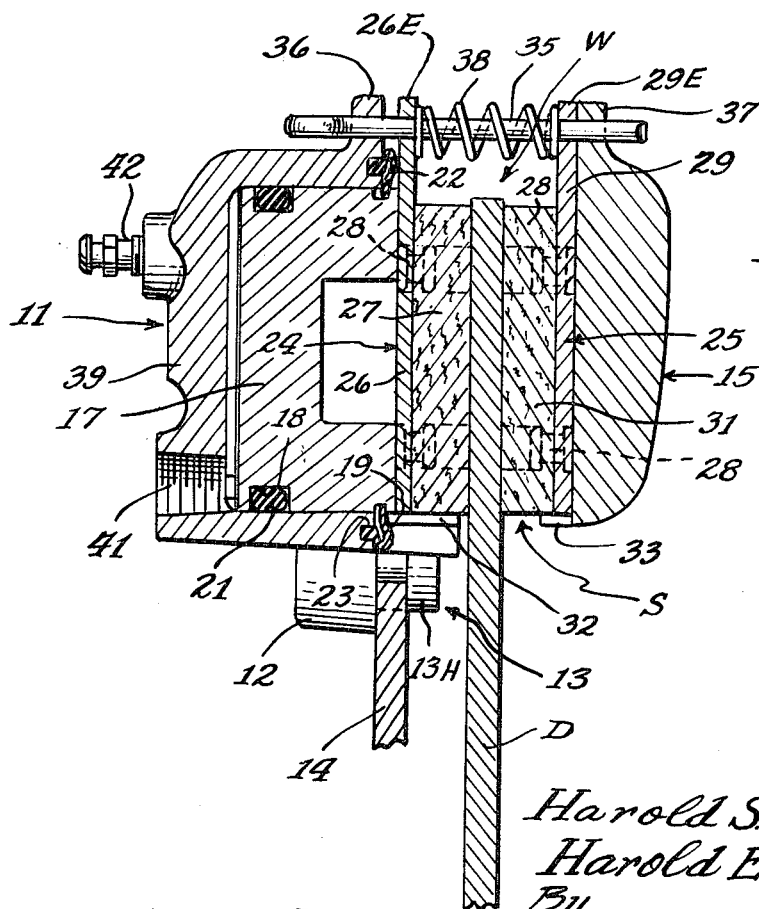
Inventors
Harold S. Hollnagel &
Harold E. Hollnagel
By
Dressler, Goldsmith, Clement & Gordon
Attys.

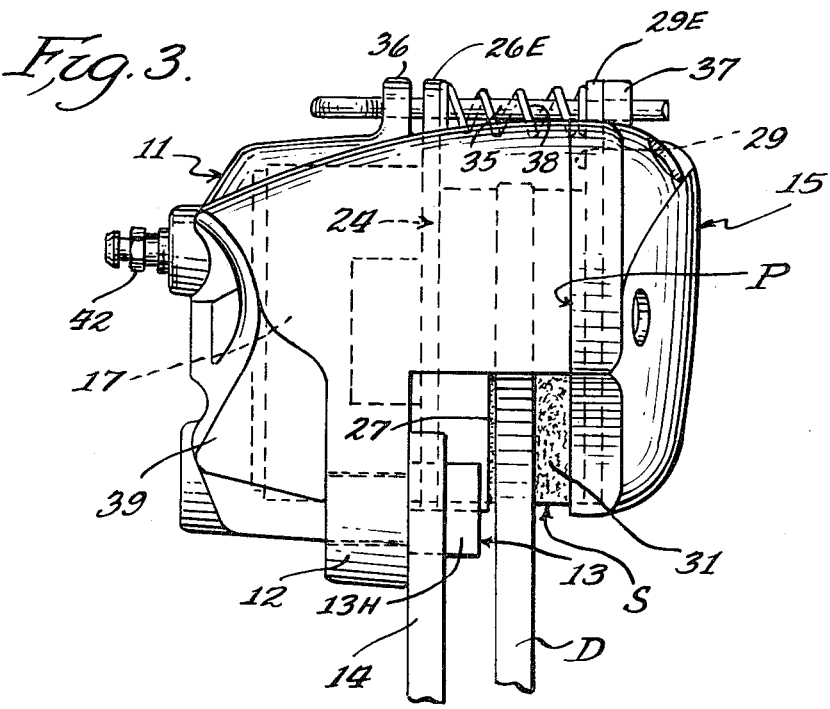

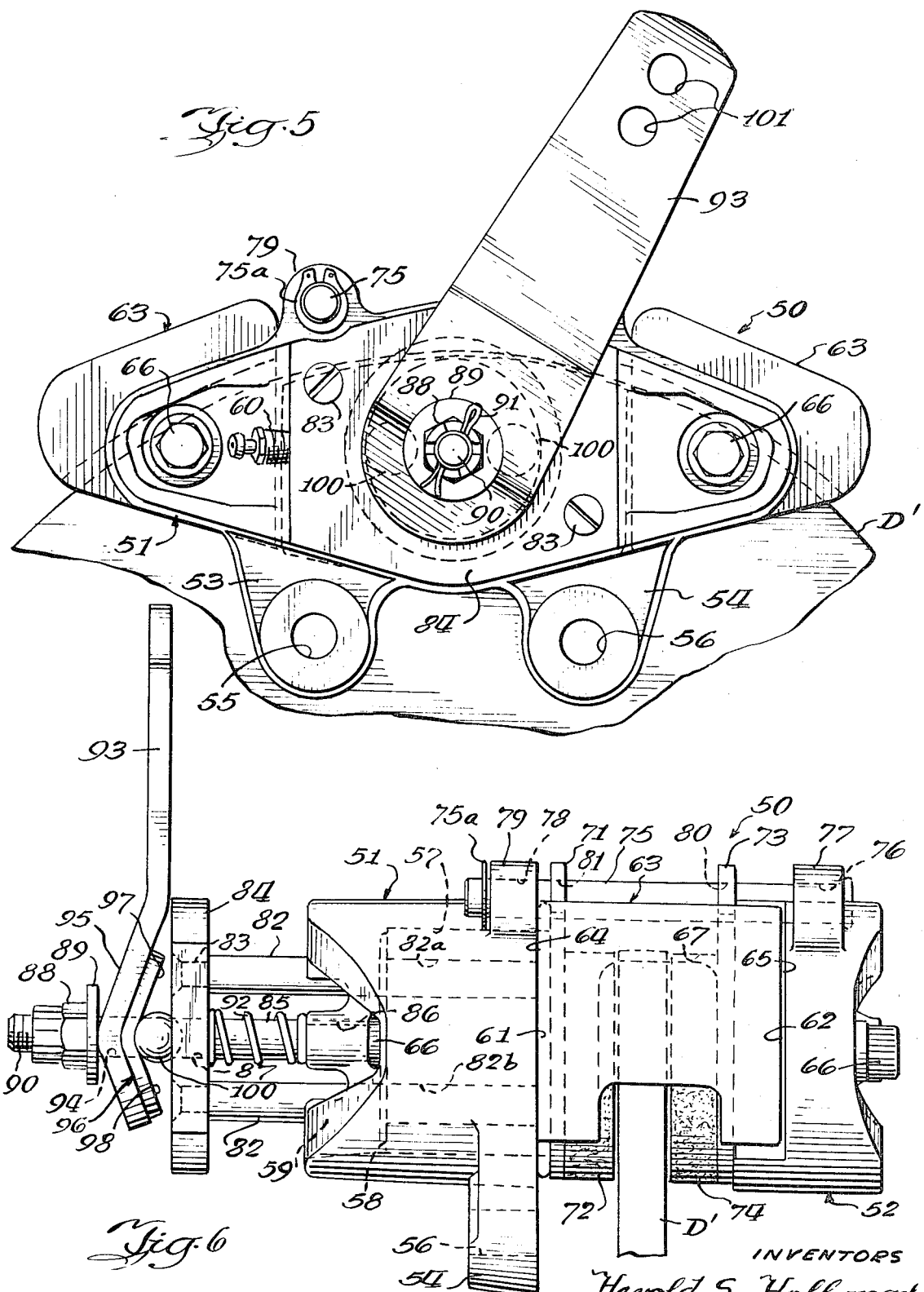

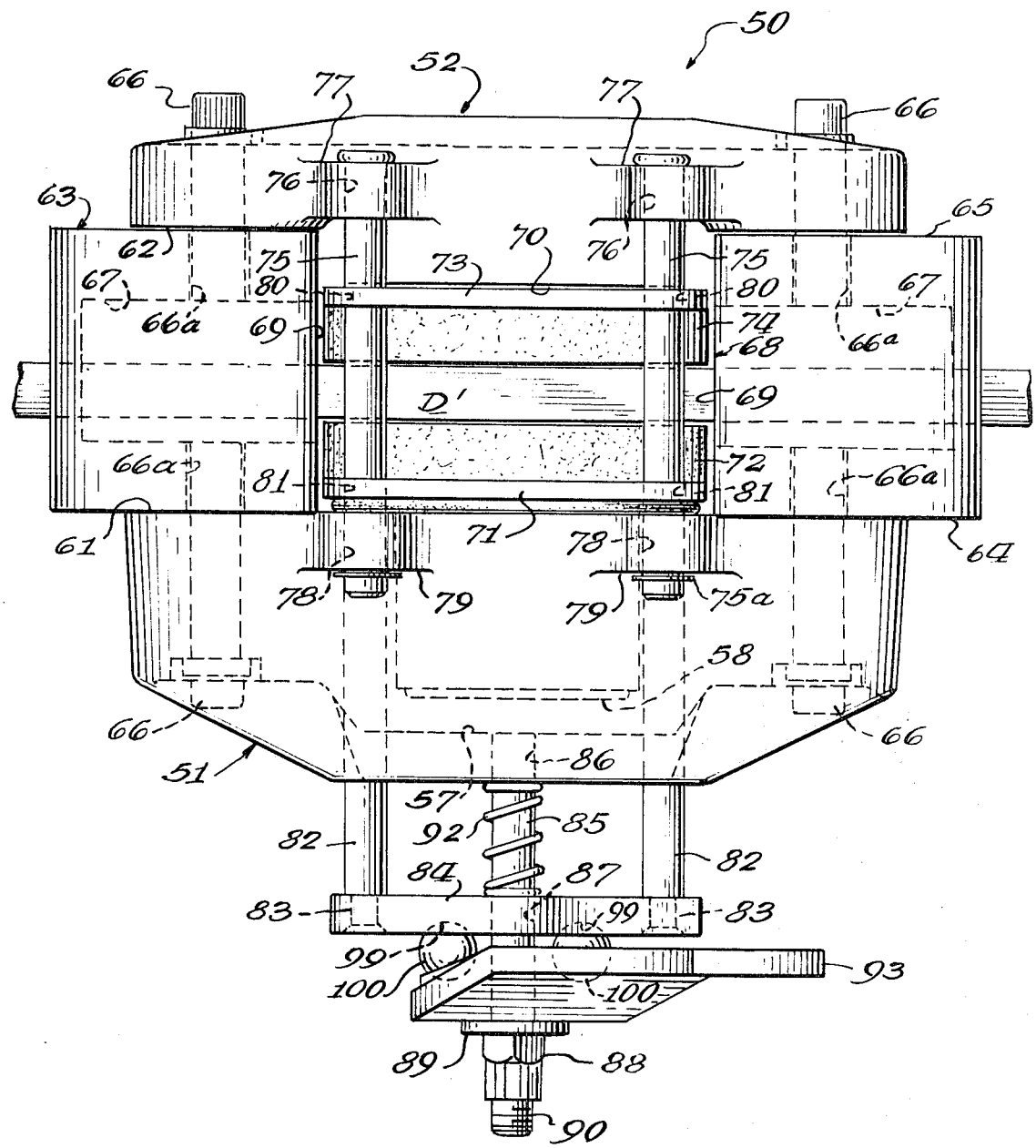

Sept. 22, 1970   H. S. HOLLNAGEL ET AL   3,530,493
FLOATING FRICTION BRAKE FOR ROTARY DISK
Filed Oct. 2, 1968   6 Sheets-Sheet 5

INVENTORS
Harold S. Hollnagel
Harold E. Hollnagel
BY Dressler, Goldsmith, Clement & Gordon
ATTORNEYS

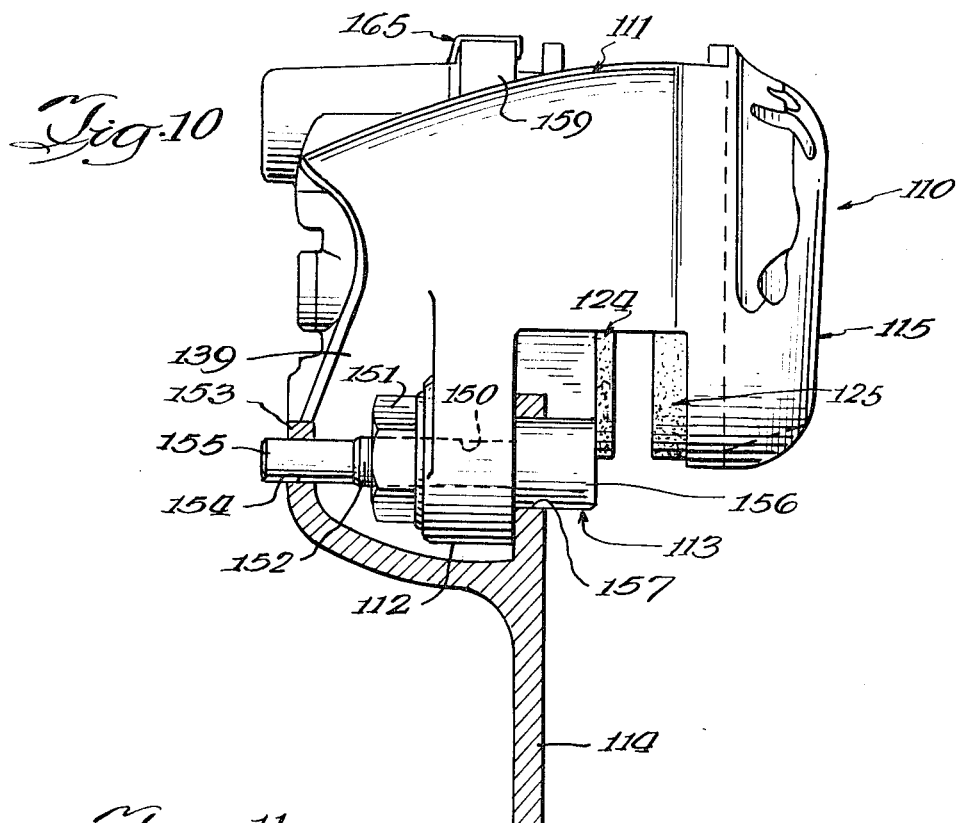
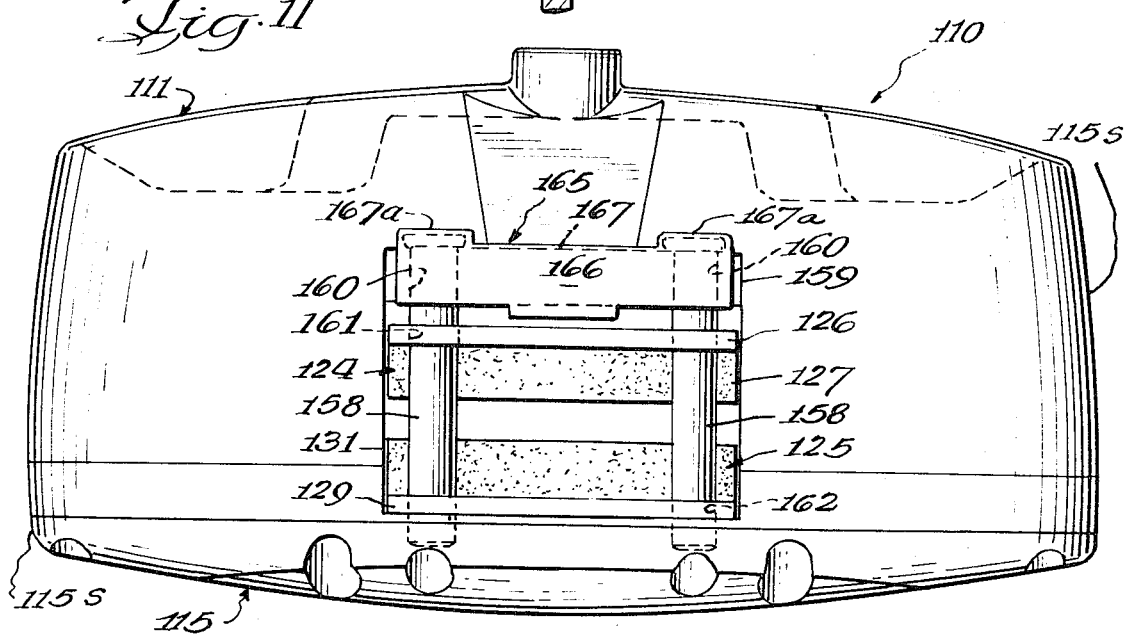

United States Patent Office 3,530,493
Patented Sept. 22, 1970

3,530,493
FLOATING FRICTION BRAKE FOR ROTARY DISK
Harold S. Hollnagel, Milwaukee, and Harold E. Hollnagel, Mequon, Wis., assignors to Kelsey-Hayes Company, a corporation of Delaware
Continuation-in-part of application Ser. No. 651,767, July 7, 1967. This application Oct. 2, 1968, Ser. No. 764,420
Int. Cl. F16d 55/224
U.S. Cl. 188—72.4       20 Claims

ABSTRACT OF THE DISCLOSURE

The brake is singly activated and comprises a dead-side housing member and a live-side housing member mounted in confronting abutting relation, the live-side housing member being floatably mounted by a pair of slide joints defined by a pair of round head socket cap screws threaded into the housing and extending in slidable relation through a butterfly-shaped mounting bracket. The live-side housing member has a load piston mounted therein, and a live friction block is disposed to be engaged by the load piston. The dead-side housing member has a friction block located stationary within it, and the two housing members are rigidly bolted together to provide a central pocket occupied by the friction blocks which are in spaced parallel relationship to receive a rotary disk mounted to operate in a fixed plane. When the brake is actuated by application of hydraulic pressure on the single load piston, both friction blocks are urged into engagement with opposite sides of the rotating disk. A bias spring mounted outboard of the housings normally reacts between the blocks. The floating mounting of the live-side housing member permits lateral adjustment of the brake to compensate for wear on the friction blocks. A further mechanical actuating means, separate and distinct from the hydraulic actuating means, may be provided for operating the brake in the event of failure of the hydraulic actuating means.

CROSS REFERENCE TO RELATED APPLICATION

This application is a continuation-in-part of our copending application (now abandoned) Serial No. 651,767, filed July 7, 1967, and entitled "Floating Friction Brake for Rotating Disk."

BACKGROUND OF THE INVENTION

This invention relates to a disk brake floatingly mounted adjacent a disk that is rotatable in a fixed plane. Disk mountings of this type are widely used in automotive, domestic and industrial applications on either mobile or stationary equipment including motorcycles, golf carts, lawn mowers, snow vehicles, door operators and crane drives, and there is a wide market for single actuated disk brakes that can effectively adjust for brake wear in the case of fixed plane rotary disks.

It has been known in the past to floatingly mount a brake caliper upon a support structure, so that the brake will continue to function effectively, even when the braking pads wear. A typical prior art arrangement that has been proposed in the past in disk brakes of the hydraulically actuated type is illustrated in Eggstein Pat. No. 3,256,-959. A further floating disk brake structure for a mechanically actuated brake is illustrated in our Pat. No. 3,358,-793, which was copending with the parent application of the present application.

While the floating brake structures mentioned in the preceding paragraph are, in general, satisfactory; they are unduly complex, when compared to the extremely simple structure of the present invention. Furthermore, known floating brake structures have not provided an arrangement wherein the braking pads can be readily removed and replaced, when necessary.

In many hydraulically actuated braking environments, it is desirable to provide a safety, or secondary, braking mechanism for use in the event of failure in the hydraulic system. Heretofore, no satisfactory secondary braking means has been provided for a disk brake structure, particularly a disk brake structure wherein the brake housing is floatingly mounted upon a support.

SUMMARY OF THE INVENTION

In accordance with the present invention, a pair of housing members are clamped together to mount a complementary set of live-side and dead-side friction blocks in spaced parallel relationship on opposite sides of a disk that is mounted to rotate in a fixed plane. The live friction block is actuated directly by a load piston slidably mounted in the housing member which is shiftably mounted from a support bracket. Fluid pressure applied to the rear of the piston simultaneously forces the live friction block into engagement with one side of the disk and moves the entire housing structure and the dead-side friction block carried therein an opposite direction to force the friction block into engagement with the opposite side of the disk. The braking action is effective even after substantial wear of the friction blocks because the brake floatingly shifts to compensate for wear. When the piston pressure is released, a bias spring reacting between the friction blocks continuously acts to center the brake.

A butterfly-shaped support element carries the live-side brake housing member by means of a pair of slide joints. Each slide joint is comprised of a round head socket cap screw that is fixed in the live housing member and accommodates limited sliding movement relative to the support element sufficient to handle the incremental wear occurring between the friction blocks and the rotary disk.

The braking mechanism of the present invention preferably includes a mechanical device formed integrally therewith, for moving the brake pads into engagement with the rotating disk to effect a braking action, even in the absence of hydraulic pressure. While formed as an integral component of the hydraulically actuated disk brake mechanism, the mechanical structure is operated entirely independently thereof, so as to provide a safety or override device.

The braking mechanism of the present invention also includes an extremely simple, yet novel, means for supporting the braking members within the housing structure; and to this end, the braking pads are carried upon backing plates that are mounted for moveement toward and away from on another by a pair of spaced parallel mounting pins. The dual pin structure provides a unique arrangement for positively guiding the backing plates into and out of braking position, and when the braking pads are in engagement with the rotating disk, the pins effectively counteract the torque created by the braking action.

Other features and advantages of the invention will be apparent from the following description and claims, and are illustrated in the accompanying drawings which show structure embodying features of the present invention and the principles thereof.

BRIEF DESCRIPTION OF THE DRAWINGS

FIG. 1 is a bottom plan view of a brake embodying the invention;

FIG. 2 is a cross sectional view, taken generally in the plane indicated by the line 2—2 of FIG. 1, but with the brake rotated 90° and mounted on a support bracket with its friction blocks engaging a rotary disk;

FIG. 3 is an end elevational view of the structure shown in FIG. 2;

FIG. 4 is a front elevational view of the brake;

FIG. 5 is a front elevational view of a modified brake structure, including a mechanical brake safety device;

FIG. 6 is a side elevational view of the structure illustrated in FIG. 5;

FIG. 7 is a top plan view of the structure illustrated in FIGS. 5 and 6;

FIG. 10 is an end elevational view of the structure of FIGS. 8 and 9 mounted upon a support brake; and FIG. 11 is a top plan view of the structure of FIGS. 8–10.

DESCRIPTION OF PREFERRED EMBODIMENTS

Figure 8:
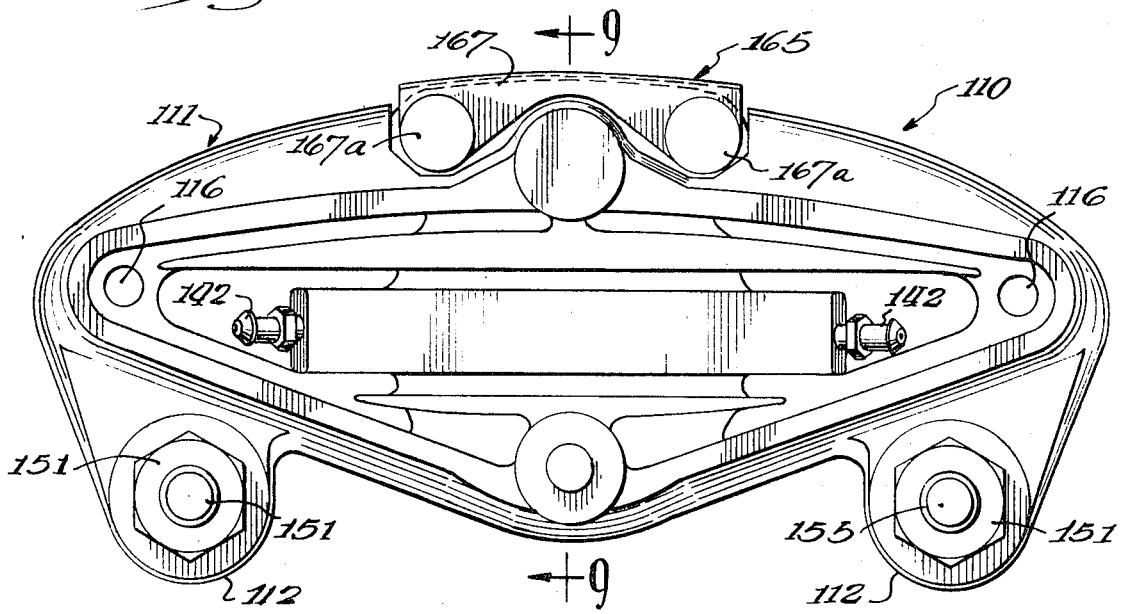
FIG. 8 is a front elevational view of a further brake modification.

While this invention is susceptible of embodiment in many different forms, there is shown in the drawings and will herein be described in detail only several specific embodiments of the invention, with the understanding that the present disclosure is to be considered as an exemplification of the principles of the invention and is not intended to limit the invention to the specific embodiments and modifications illustrated herein. The scope of the invention will be pointed out in the appended claims.

Referring to the drawings, the brake comprises a live-side housing member 11 having a pair of integral lugs 12 projecting therefrom along a corresponding elongated side edge of the housing member. Each of the lugs 12 has a tapped hole to receive the threaded shank of a round head socket cap screw 13. The heads 13H of the cap screws are slidably engaged in guide holes in a butterfly-shaped mounting bracket 14 so that the cap screws define a pair of spaced parallel slide joints between the housing 11 and the bracket 14 to provide a floating mount for the brake. A dead-side housing member 15 is held in rigid abutting engagement with the housing member 11 by a plurality of bolts 16. The round heads 13H on the screws project far enough beyond the mounting bracket 14 to provide a range of sliding support for the brake housing structure to permit sliding movement of the brake housing in a direction normal to the mounting bracket.

A load piston 17 is mounted within a pressure chamber defined in the cup-shaped housing member 11, the piston being axially slidable towards or away from the dead-side housing member 15. The piston has an annular groove 18 in its side wall near its rear end and a second annular groove 19 near its front end. An O-ring 21 is seated in the groove 18 and provides a seal between the back end of the piston and the housing member 11. A seal strip 22 of any suitable flexible material has a floating edge engaged in the groove 19 and an anchored edge secured in an annular groove 23 in the face of the housing member 11 to provide a flexible dust cover that protects the space between the piston and the inner wall surface of the housing member 11. The strip 22 has sufficient slack to permit the necessary relative movement between the piston 17 and the housing member 11.

The piston 17 and the housing member 15 present opposed inner surfaces in spaced parallel relationship to define a central mounting pocket. A live-side friction member 24 is positioned adjacent the inner surface of the piston, and a dead-side friction member 25 is positioned adjacent the inner surface of the housing member 15. The friction member 24 comprises a plate 26 having one face juxtaposed against the piston and a friction block 27 secured to the opposite face of the plate 26 by countersunk rivets 28 or other suitable fastener elements. The friction member 25 similarly comprises a plate 29 having one face against the inner surface of the housing member 15 and a friction block 31 secured to the opposite face of the plate 29 by countersunk rivets 28.

Whereas the side walls 11S and 15S of the housings meet at the plane indicated at P in FIGS. 1 and 3, these side walls are relieved along one side to define an access slot S for receiving the periphery of a rotary disk D. The side walls are also relieved centrally along the opposite side to define an access window W for removal or insertion of the friction blocks. The slot S is of maximum width at its center region where the friction blocks engage the disk D and is of restricted width at its end regions where the side wall edge regions 11E and 15E are spaced apart only sufficiently to receive the disk, while providing partial overlap with the friction elements to retain and guide the same.

The brake disclosed herein has a floating mounting to adapt to the rotary disk D which is mounted to rotate in a fixed plane, the mounting shaft for the disk, forming no part of the invention, is not disclosed herein.

The plates 26 and 29 have free edges 26E and 29E that extend beyond the friction blocks 27 and 31 and are apertured to telescope over opposite ends of a cotter pin 35 or similar fastener element. The cotter pin 35 also extends through aligned apertures in peripheral lug portions 36 and 37 that are integral with housing members 11 and 15, respectively, and extend outwardly therefrom in spaced confronting relationship. The cotter pin helps to guide the friction members 24, 25 in their movement into and out of frictional braking engagement with the disk D. A coil-type compression spring 38 encircling the cotter pin is biased against the opposed surfaces of the plates 26 and 29 to hold the friction member 24 against the inner surface of the piston and the friction member 25 against the inner surface of the housing member 15. The spring 38 also helps to space the friction members from the rotary disk after each braking operation.

The housing member 11 has a back wall 39 provided with an inlet opening 41 and a pair of bleeder valves 42. The inlet opening permits the flow of fluid under pressure into the space between the piston and the back wall 39 of the housing 11. The fluid exerts pressure against the back side of the piston 17 and the back wall 39 of the housing member 11 to move the piston and the housing assembly in opposite directions simultaneously. As viewed in FIG. 2, the piston is urged towards the right and the housing assembly is urged towards the left. The piston presses the friction block 27 against one face of the rotary disk D while the housing assembly holds the friction block 31 against the opposite face of the disk. Braking pressure cannot be effective against either side of the rotary disk until after both friction blocks are in engagement with the sides of the disk. After both friction blocks are in engagement with the rotary disk, the fluid exerts braking pressure against both sides of the disk evenly to stop rotational movement of the disk. If either friction block becomes worn, it will still move into engagement with the disk before the rotational movement of the disk can be stopped.

The movement of the friction blocks necessary to stop the rotational movement of the disk D compresses the spring 38. When the fluid pressure is released, the spring 38 returns to normal precompressed condition, thereby restoring the friction blocks to spaced relation. The piston may be either a retracting or non-retracting type.

It should be noted that the wear at the friction blocks occurring during extended use requires floating adjustment of the brake relative to the disk D, this being accommodated by the slide joints provided by the round head cap screws 13.

Upon extreme wear, the friction blocks are removable and replaceable by withdrawing the cotter pin and withdrawing the worn blocks edgewise through the opening W at the cotter pin side of the housing assembly.

Figure 9:
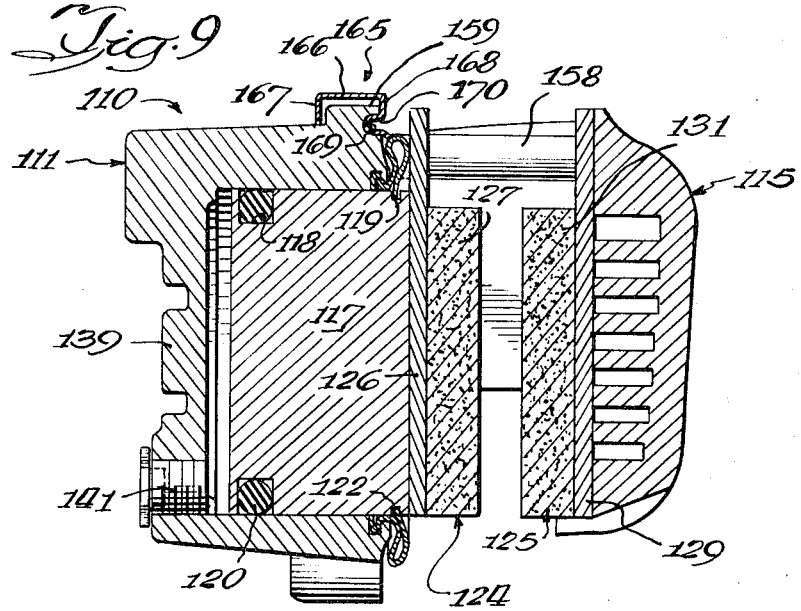
FIG. 9 is a cross sectional view taken generally along line 9—9 of FIG. 8.

Referring now to the embodiment of FIGS. 5–7, the brake mechanism illustrated therein is designated generally at 50, and includes first and second housing members 51 and 52 positioned in confronting relationship with respect to one another. Lugs 53 and 54 extend downwardly from housing member 51, and the lugs 53 and 54 include respective openings 55 and 56 which receive round head socket cap screws to slidably mount the housing member 51 upon a support bracket, as is illustrated and described above in connection with the embodiment of FIGS. 1–14.

Housing member 51 includes a cylinder 57 which opens rearwardly of the housing member, and a piston 58 is mounted for sliding movement within cylinder 57. A fluid inlet 59 (FIG. 5) extends through the forward wall of housing member 51 and communicates with cylinder 57. A bleeder valve 60 also communicates with the cylinder 57.

Housing member 51 includes an upright, planar rear face 61 that is positioned in spaced parallel relationship with a planar front face 62 of second housing member 52. Spacers 63 are interposed between housing members 51 and 52, and the spacers have opposite planar faces 64 and 65 positioned in face abutting engagement with housing surfaces 61 and 62, respectively. Spacers 63 retain the housing members 51 and 52 in spaced relationship with respect to one another, and the spacers and housing members are retained as an integral unit by screws 66 which pass through clearance openings in the housing members and which are threaded into internally threaded holes 66a in the spacer members.

Spacer members 63 each include a recessed central portion 67 to define a downwardly opening elongate slot for reception of a rotating disk D'. As can be best seen in FIG. 7, the facing surfaces 69 of spacers 63 are spaced from one another and cooperate with the rearward surface 61 on housing member 51 and a forwardly offset central surface 70 of housing member 52 to collectively define a window 68 for insertion and removal of braking pads to be hereafter described.

The brake 50 further includes a pair of spaced braking members 72 and 74, each positioned on one side of disk D', and the braking members are carried upon respective backing plates 71 and 73. In the illustrated embodiment, the braking members 72 and 74 are adhesively secured to the backing plates 71 and 73, although any other form of securing means may be used.

The backing plates 71 and 73 extend outwardly of the window 68 (FIG. 6), and the plates are supported upon a pair of parallel, elongate members, in the form of headed pins 75, which extend through aligned openings 80 and 81 in backing plates 73 and 71, respectively. Lugs 77 and 79 are formed integrally with housing members 52 and 51, respectively, and extend upwardly therefrom, with pins 75 also impaling aligned openings 76 and 78 in lugs 77 and 79, respectively. As is evident from FIGS. 6 and 7, the heads of pins 75 bear against the rearward surface of lugs 77, and suitable fasteners, such as C-washers, are positioned in grooves in the outer ends of pins 75 adjacent the forward face of lugs 79 to retain the pins against axial movement.

The brake 50 includes mechanical means for moving the braking members 72 and 74 into braking engagement with disk D' in the event of a failure in the hydraulic system which would prevent the piston 58 from effecting actuation of the brake mechanism. To this end, a pair of push pins 82 are slidably mounted in laterally spaced, vertically offset guide holes 82a and 82b in housing member 51, with the rearward ends of push pins 82 bearing against backing plate 71. The forward ends of push pins 82 are secured to a yoke plate 84 by screws 83, the heads of which are countersunk into the forward face of the yoke plate. A stud 85 is fixed to the housing member 51 by having its rearward end threaded into an internally threaded hole 86 in the housing member, and as is evident from comparing FIGS. 6 and 7, stud 85 is located centrally between push pins 82.

The mechanical brake is actuated by a cam arm 93, and stud 85 passes through a clearance opening 94 (FIG. 6) in the lower portion of cam arm 93. Stud 85 also extends through a clearance opening 87 in yoke plate 84, and a nut 88 is threaded upon the outer externally threaded end 90 of stud 85 to force a thrust washer 89 against the forward face of cam arm 93. A cotter pin 91 (FIG. 5) may extend through a transverse opening in the end of stud 85, to retain the nut 88 and thrust washer 89 thereon. A compression spring 92 surrounds stud 85 and is biased between housing 51 and yoke plate 84 to urge the push pins 82 outwardly away from backing plate 71.

Cam arm 93 includes a bent lower end 95, and a cam block 96 is mounted on the rearward face thereof. Cam block 96 includes inclined camming surfaces 97 and 98, which coact with cam followers in the form of spaced balls 100. Balls 100 are seated within spherical recesses 99 in the forward face of yoke plate 84, and in the unactuated position of the brake, the balls 100 are seated within the lateral junction between cam surfaces 97 and 98. Cam arm 93 includes means for securing it to a control device, such as a rod or a cable, and such means is defined by a pair of openings 101 in the upper end of the cam arm. The rod or cable actuating means for the mechanical brake device can be operated from a foot pedal or hand control, depending upon the environment in which the brake is used.

From the foregoing, it will be appreciated that when the hydraulic actuating means for the brake 50 fails for one reason or another, the mechanical brake can be actuated by pivoting a cam arm 93 in either direction to bring either cam surface 97 or 98 into engagement with the balls 100 to shift the yoke plate 84 and push pins 82 rearwardly against the bias of spring 92. When the braking action has been effected, cam arm 93 is returned to the position of FIG. 5, and the spring 92 shifts the push pins 82 out of engagement with the backing plate 71.

Turning now to the embodiment of FIGS. 8–11, the structure illustrated therein is similar to that illustrated in FIGS. 1–4, so that similar reference numerals have been used to indicate corresponding elements, with the reference numerals in FIGS. 8–11 being in the 100 series. The structure in FIGS. 8–11 which is identical to that of FIGS. 1–4 will not be described in detail, and reference can be made to the description of the embodiment of FIGS. 1–4 for these details.

The embodiment of FIGS. 8–11 is floatingly mounted upon a support plate 114 by a structure which is similar to that described above in connection with the embodiment of FIGS. 1–4, but which is a significant improvement thereon. As with the previous embodiment, internally threaded means is associated with the lugs 112 on housing member 111 for cooperation with round head socket cap screws 113. However, in the embodiment of FIGS. 8–11, the shanks of screws 113 pass through clearance openings 150 in lugs 112, and the internally threaded means are defined by nuts 151 that are threaded upon externally threaded portions 152 of screws 113. As can be seen in FIG. 10, support bracket 114 is provided with stabilizing arms 153 that extend outwardly from the support bracket into parallel relationship therewith. Stabilizing arms 153 include clearance openings 154 that are positioned in alignment with the openings 150 in the lugs 112, and the screws 113 include outer portions 155 that are guided and supported in openings 154. As with the embodiment of FIGS. 1–4, the cylindrical heads 156 of screws 113 are slidably mounted in openings 157 of support bracket 114 to enable the housing members 111 and 115 to move relative to the rotating disk (not shown).

As with the embodiment of FIGS. 5–7, the backing plates 126 and 129 of the embodiment of FIGS. 8–11 are supported upon a pair of elongate members in the form of headed pins 158. A lug 159 extends outwardly from housing member 111 and pins 158 extend through spaced parallel openings 160 in lug 159 that are aligned with openings 161 in backing plate 126 and openings 162 in backing plate 129.

A novel retaining clip 165 holds the pins 158 against movement relative to the housing member 115, and obviates the necessity of separate fastener members for this purpose. As can be best seen in FIG. 9, retaining clip 165 is generally U-shaped in cross section, and includes a central bight portion 166 and depending legs 167 and 168. The rearward face of lug 159 includes a recess 169 and leg 168 of the retaining clip includes an offset portion 170 that is received in recess 169. Retaining clip leg 167 includes forwardly offset portions 167a which embrace the heads of the pins 158, so that when the clip 165 is in place, the pins 158 are held against axial movement by the cooperative action of the retaining clip legs 167 and 168.

What is claimed is:

1. In braking apparatus that includes a floating friction brake engageable with a disk mounted to rotate in a fixed plane, said friction brake comprising two housing members, means rigidly interconnecting said housing members to prevent relative movement therebetween, said housing members defining a central pocket therebetween that is open toward one side through an elongated disk entry slot and that is open towards an opposite side through an access window, a piston axially slidable in one of said housing members, said piston and said other housing member having opposed inner surfaces in spaced parallel relationship bordering said pocket, a pair of backing plates, a friction member carried by each backing plate and enterable edgewise through said window and positioned adjacent each of said inner surfaces, each backing plate having a portion that extends outwardly of said window, said backing plate portions and said two housing members having two spaced sets of aligned openings, an elongate member impaling each set of said aligned openings, said elongate members being pins having an enlarged head at one end thereof bearing against a first side of one of said housing members, retention means engaging said one housing member and said heads for preventing axial movement of said elongate members, said retention means being defined by a generally U-shaped clip having a first leg engaging said heads and having a second leg engaging a second side of said one housing member opposite from said first side, said second side having a groove and said second leg having an offset portion received in said groove, a fixed support bracket having a pair of guide openings therein, a pair of slide members fixed to said first mentioned housing member, each slide member being mounted for axial sliding movement in one of said openings, and fluid pressure means for moving said housing members and said piston in opposite directions to urge said friction members toward each other.

2. In braking apparatus that includes a floating friction brake engageable with a disk mounted to rotate in a fixed plane, said friction brake comprising two housing members, means rigidly interconnecting said housing members to prevent relative movement therebetween, said housing members defining a central pocket therebetween that is open toward one side through an elongated disk entry slot and that is open towards an opposite side through an access window, a piston axially slidable in one of said housing members, said piston and said other housing member having opposed inner surfaces in spaced parallel relationship bordering said pocket, friction members enterable edgewise through said window and positioned adjacent each of said inner surfaces, a fixed support bracket having a pair of guide openings therein, a pair of slide members fixed to said first mentioned housing member, each slide member being a round head cap screw having a cylindrical end portion mounted for axial sliding movement in one of said openings, and fluid pressure means for moving said housing members and said piston in opposite directions to urge said friction members toward each other.

3. In braking apparatus as recited in claim 2 and wherein said brake includes resilient means pressing each of said friction members against the inner surface adjacent thereto.

4. In braking apparatus as recited in claim 2 in which each of said friction members comprises a plate and a friction block secured to one face thereof, said apparatus including a compression spring reacting between marginal portions of said plates at the region of said window to urge each plate towards the adjacent inner surface.

5. In braking apparatus as recited in claim 2 and having a spring reacting between said friction members for moving said housing members in unison and said piston in opposite directions to release said friction members from said disk.

6. In braking apparatus as recited in claim 2 in which each round head cap screw is fixed to said one housing member by internally threaded means, each round head screw having an externally threaded portion coacting with said internally threaded means.

7. In braking apparatus as recited in claim 6 in which said guide openings are internally threaded to define said internally threaded means.

8. In braking apparatus as recited in claim 6 in which said internally threaded means are defined by nuts threaded on said externally threaded portions.

9. In braking apparatus as recited in claim 6 in which said support bracket has stabilizing means therein which extend outwardly therefrom to support said round head screws.

10. In braking apparatus as recited in claim 9 in which said stabilizing means are defined by first and second stabilizing arms, each arm being positioned in alignment with a guide opening in said support bracket and each arm having an opening therein receiving and supporting a portion of one round head screw.

11. In braking apparatus as recited in claim 2 in which each friction member is carried by a backing plate, each backing plate having a portion that extends outwardly of said window, and wherein said two housing members and said backing plate portions have aligned openings impaled by an elongate member.

12. In braking apparatus as recited in claim 11 in which said backing plate portions and said two housing members have two spaced sets of aligned openings, each set being impaled by an elongate member.

13. In braking apparatus as recited in claim 12 in which said elongate members are pins having an enlarged head at one end thereof bearing against a first side of one of said housing members, and including retention means engaging said one housing member and said heads for preventing axial movement of said elongate members.

14. In braking apparatus as recited in claim 13 in which said retention means is defined by a generally U-shaped clip having a first leg engaging said heads and having a second leg engaging a second side of said one housing member opposite from said first side.

15. In braking apparatus as recited in claim 2 including means, separate and distinct from said fluid pressure means, for moving said friction members toward one another.

16. In braking apparatus as recited in claim 15 wherein said separate and distinct friction member moving means includes a pair of push rods mounted for movement relative to said one housing member, and cam means for effecting movement of said push rods.

17. Braking apparatus comprising: support structure having spaced first and second surfaces facing in opposite directions; first and second braking members mounted on said support structure in spaced relationship with respect to one another, said braking members being adapted to having a rotating disk positioned therebetween; means mounting said braking members for movement toward and away from one another, said means including at least one elongate member extending through said support structure and both of said braking members, said elongate member having an enlarged head bearing against the first surface of said support means for preventing movement of said elongate member in one direction; and a retaining clip for preventing axial movement of said elongate member, said retaining clip being generally U-shaped in cross section having a first leg bearing against the head of said elongate member for preventing movement of said elongate member in a direction opposite to said first direction, said clip having a second leg bearing against said second surface on said support structure for counteracting forces tending to move said elongate member in said opposite direction.

18. Braking apparatus as set forth in claim 17 wherein the second surface of said support means includes a groove, and wherein the second leg of said retaining clip has an offset portion received in said groove.

19. Braking apparatus as set forth in claim 17 in which said mounting means includes a pair of identical elongate members extending through said support structure and both of said braking members.

20. Braking apparatus as set forth in claim 19 in which a single retaining clip is provided, with the first leg of said clip bearing against the heads of both of said elongate members.

References Cited

UNITED STATES PATENTS

| | | | |
|---|---|---|---|
| 2,784,811 | 3/1957 | Butler | 188—73 |
| 3,035,664 | 5/1962 | Desvignes et al. | 188—73 |
| 3,114,436 | 12/1963 | Larson | 188—73 |
| 3,199,635 | 8/1965 | Bessler et al. | 188—73 |
| 3,243,017 | 3/1966 | Kleinstuck | 188—73 |
| 3,298,468 | 1/1967 | Buyze | 188—73 |
| 3,357,528 | 12/1967 | Verlinde | 188—73 X |
| 3,410,371 | 11/1968 | Burnett | 188—73 |

FOREIGN PATENTS

| | | |
|---|---|---|
| 968,897 | 9/1964 | Great Britain. |
| 1,072,435 | 6/1967 | Great Britain. |

GEORGE E. HALVOSA, Primary Examiner

U.S. Cl. X.R.

188—106